Figure 1:
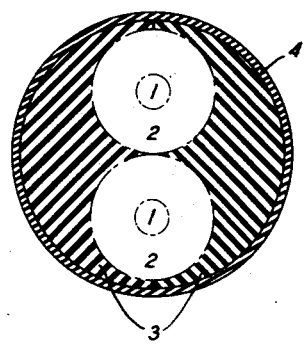

May 8, 1934.  O. E. BUCKLEY ET AL  1,957,487
MULTICORE CABLE WITH THERMOPLASTIC INSULATION
Filed Nov. 12, 1930

INVENTORS: O. E. BUCKLEY
F. S. MALM
BY
ATTORNEY

Patented May 8, 1934

1,957,487

UNITED STATES PATENT OFFICE 1,957,487

MULTICORE CABLE WITH THERMOPLASTIC INSULATION

Oliver E. Buckley, Maplewood, N. J., and Frank S. Malm, Nordenham, Germany, assignors to Bell Telephone Laboratories, Incorporated, New York, N. Y., a corporation of New York Application November 12, 1930, Serial No. 495,034
In Great Britain January 15, 1930

5 Claims. (Cl. 173—264)

This invention relates to submarine electric signaling cables and more especially to the type of cable having a plurality of cores.

An object of the invention is to improve the physical properties, such as tensile strength and homogeneousness of deep sea signaling cables.

Another object is to reduce the breakage of filling or worming material of cables during manufacture and laying.

Another object is to improve the electrical properties of deep sea plural core cables.

In cables of the type set forth it has been the practice to lay two or more cores, that is two or more conductors with or without magnetic material wrapped therearound, and with an insulating sheath thereon, side by side either parallel with one another or twisted or laid like the strands of a rope and also to lay wormings of jute or similar material in the interstices between the cores to bring the whole to a substantially circular shape. Thereafter, according to the prior practice, the multiple core thus constructed was served with jute or the like and thereafter armored.

According to the present invention, in a deep sea telephone or telegraph cable of the plural core type the interstices between the several cores are filled with a material of good dielectric properties substantially impervious to sea water, such for example, as india-rubber.

It is desirable from the mechanical standpoint that the material utilized for filling the interstices between the cores, hereinafter referred to as the filler, should be rigid enough to withstand the stresses encountered during the manufacture and laying of the cable but it should not be so rigid, hard or stiff as to damage the cores of the cable. It should also be flexible so that, if need be, it can be stored upon drums during manufacture, and so that it impairs the flexibility of the cable but little. The material should be such that, when under tension, it stretches in a manner similar to the cores.

It has been found with the application of jute filler to large diameter twin core cables of the deep sea signaling type that strains of the magnitude involved in laying the cable rupture the jute. Furthermore it is difficult to fill the concavo-convex inter-conductor spaces with closely fitting fillers of jute. Also jute has an elasticity, tensile strength and other physical properties very different from thermoplatsic insulation such as gutta percha and its substitutes.

Materials which are particularly suitable for fillers in accordance with the present invention are rubber prepared according to British patent specification No. 223,644 or according to British patent specification No. 307,966, if desired with the addition of a relatively large quantity of Montan wax or solid paraffin hydrocarbon wax derived from petroleum and having a melting point from about 70° C. to 80° C. In cases where cheapness is an important factor and where the electrical requirements are not too drastic the filler may consist of heavily loaded reclaimed rubber stock, either thermo-plastic or vulcanized.

The use of a filler of the nature set forth results in important advantages from the electrical standpoint as compared with the use of jute and the like. When jute or the like is utilized for the filler the cores are effectively surrounded with sea water which penetrates the filler. In this case the capacitance and leakance per unit length of the cables may be 60% or 70% higher than in cases where a filler of the nature set forth is utilized. Although the full extent of the theoretically possible reduction in leakance and capacitance by the use of the invention may not be realized in practice, a pronounced improvement may be expected. Thus for a given maximum frequency of signaling wave, or for telephony the size of cable for a given length may be diminished, or a greater length of cable may be utilized for the same quality of signaling. Moreover, the possible reduced separation of the conductors resulting from the invention greatly diminishes the losses in the armor wires of the cable, and thus permits a further reduction in the size of the cable or increase in the length thereof.

In the application of the fillers to a cable one of several methods may be adopted.

In one method the fillers may be directly extruded over the cable cores. The two or more cable cores may be passed through separate entrance dies of an extruding machine, and may emerge through a common exit of the appropriate diameter, the filler material being extruded through the exit die in a cylindrical shape. Alternatively, the two or more bare conductors may be passed through a separate entrance die into an extrusion machine and may emerge through a common circular exit die, in which case the filler material may be the same as the actual insulating material of the separate cores. If desired, however, the extrusion machine may have a plurality of compartments and appropriate extrusion dies through which the bare conductors may be passed, and which extrude insulating material such as gutta percha thereover before the cores thus formed pass out of the machine through a common exit die which extrudes thereover a separate filler material. If the conductors are continuously loaded, a protective layer of pressure equalizing compound may be applied to each conductor in the usual manner before its entry into the extrusion machine.

The above methods of providing the cable with fillers are suitable for cables in which the various cores lie parallel with one another in the cable. In cases in which it is required that the cable cores should be laid with one another after the manner of the strands of a rope, the cores may be laid up or twisted in the usual manner before their entrance into the extruding machine. The laid cable cores pass through the extrusion machine and emerge through a circular die by which the filler material is extruded to fill the interstices between the several cores. In certain cases the cores may be fed into a common entrance die of the extrusion machine lying parallel to one another instead of twisted or laid. Where the cores are twisted, however, the length of the entrance die of the extrusion machine may be somewhat shorter than in cases where the cores are not twisted, since the screw action of the twisted cores serves to prevent the filler material from being forced out backwards through the entrance die. If necessary, the cores may be smeared with Chatterton's compound or a binding material of similar mechanical and better electrical properties (described by Kemp, U. S. patent application, Serial No. 452,518, filed May 14, 1930) before being presented to the extrusion machine or they may be heated moderately to promote adhesion of the filler material. Adhesive materials suitable for the purpose and having a dielectric constant and leakance lower than high grade gutta percha are known.

In another method of applying the fillers to a cable the fillers may be made up independently in long lengths having the appropriate shape of cross section. For example, for a two core cable, two fillers may be utilized each of substantially semi-circular cross section, having semi-circular notches in their bounding diameters to accommodate the cores. The bounding diameters may respectively be provided with keys in the form of projections and notches which engage one another. In the case of a three or four core cable, three or four fillers of appropriate section may be utilized. The fillers may be laid upon the cores and the joints between the several fillers may be made completely water proof by soft rubber or similar gaskets interposed between the several fillers, or by coating the jointed surfaces and inside surfaces of the fillers and/or the cable cores with Chatterton's compound or the substitute therefor mentioned above, or with a cold vulcanizing fluid. To complete the cable a tight wrapping of rubber tape is laid on in overlapping convolutions over the fillers. Thereafter a protective covering of jute or the like may, if desired, be laid on, and the necessary armoring may be placed over this protective covering in the usual manner.

In certain cases it may be convenient to include additional cable conductors in the material of the fillers themselves. It would be desirable in a long telephone cable to have an auxiliary circuit of low capacity and inductance and consequent high propagation speed for the transmission of impulses utilized in the operation of voice frequency direction control. A circuit of this sort can be provided in the cable by embedding in each of the fillers of a two-core telephone cable an unloaded copper conductor and using these two conductors for the required auxiliary circuit.

Figure 2:
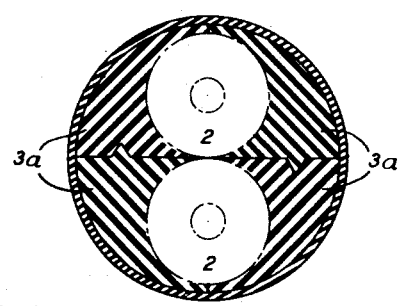
Figure 3:
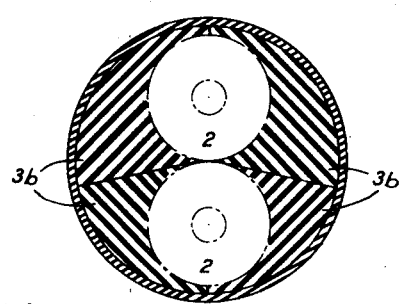
Figure 4:
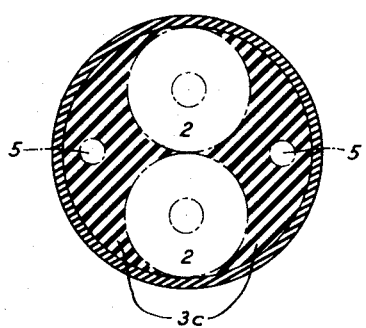
Figure 5:
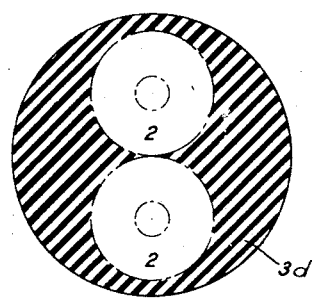

In the appended drawing,

Fig. 1 represents a twin core cable with a rubber filler for rounding out the twin cores, Figs. 2 and 3 represent twin core cables in which fillers of modified shapes lie about the twin cores, Fig. 4 represents a twin core cable in which the fillers are shaped to just bring the total diameter of the filled twin core structure to the dimension of twice a single core, and Fig. 5 represents a twin core cable with an extruded rubber filling material.

In Fig. 1 the conductors 1 which are covered with loading material in the usual manner are covered with gutta percha or other suitable thermo-plastic insulation 2 are assembled with suitable strips 3 composed of rubber or other filling material of similar characteristics. The adhesive between the insulation 2 and filler strips 3 is too thin to show on any practical scale. Rubber strips are wound helically about the conductor to form a layer 4. The usual jute bedding and armor wire will be applied around the layer 4.

In Fig. 2 each half of the filler is divided into two strips $3a$ which have notched surfaces adapted to fit together. An adhesive layer (not shown) is provided between the notched surfaces and upon the surface of the insulation 2.

In Fig. 3 the fillers are divided into strips $3b$ of a somewhat different shape.

In Fig. 4 the fillers $3c$ are made no larger than necessary to round out the insulation 2 of the cable cores 2 to a cross section twice the diameter of a single core. The copper wires 5, 5 may serve as an auxiliary circuit for voice frequency direction control or other purposes.

Fig. 5 represents a structure in which a filler $3d$ is extruded about the insulation 2 of the two cores to form a twin core structure of circular cross-section upon which the usual jute bedding and armor may be placed.

What is claimed is:

1. A multi-conductor signaling cable comprising several conductors surrounded by layers of unvulcanized thermo-plastic insulation in which the structure is rounded out to approximately circular form by means of a filler, characterized in this, that the filler is composed of several vulcanized strips consisting principally of rubber with watertight joints between the strips.

2. A multi-conductor signaling cable comprising several conductors surrounded by layers of plastic insulation, vulcanized filler strips associated therewith to round out the structure to approximately circular form, said strips consisting principally of rubber, and a layer of an insulating adhesive of dielectric constant and leakance at least as low as high grade gutta-percha covering the surface at the joint between filler surfaces and insulated conductor surfaces.

3. A multi-conductor signaling cable comprising several conductors surrounded by layers of unvulcanized plastic insulation, including filler strips to round out the structure to approximately circular form, said filler strips consisting principally of vulcanized rubber, the electrical insulation properties of which have been improved by the addition of waxes incorporated uniformly throughout the filler structure, and an insulating adhesive composition firmly cementing the plastic insulation and filler strips into a watertight envelope.

4. A multi-conductor signaling cable comprising several conductors surrounded by thermo-plastic insulation, filler strips associated therewith to round out the structure to approximately circular form, said filler strips consisting principally of rubber, and a helically applied strip of rubber surrounding the combined insulating conductors and filler strips and holding them into a tightly adhering mass in combination with adhesive insulating material between all the contacting surfaces of said insulation, strips and layer to cause them to adhere over their entire contacting surfaces.

5. A twin core submarine cable comprising two cores each consisting of a conductor covered with thermo-plastic insulation and rounded out to a substantially circular form by a filler of rubber tightly adhering to said cores, said filler having embedded therein one or more conductive wires of low capacity and inductance and consequently of high propagation speed as compared to the propagation speed of the conductors of the cores, said wires being insulated from water surrounding the cable structure.

OLIVER E. BUCKLEY.
FRANK S. MALM.